United States Patent [19]

Kasanuki et al.

[11] Patent Number: 5,418,771
[45] Date of Patent: May 23, 1995

[54] INFORMATION PROCESSING APPARATUS PROVIDED WITH SURFACE ALIGNING MECHANISM BETWEEN PROBE HEAD SUBSTRATE AND RECORDING MEDIUM SUBSTRATE

[75] Inventors: Yuji Kasanuki, Isehara; Katsunori Hatanaka, Yokohama; Toshihiko Miyazaki; Kunihiro Sakai, both of Isehara; Haruki Kawada, Yokohama; Tsutomi Ikeda, Hachioji; Ryo Kuroda, Kawasaki; Takehiko Kawasaki, Atsugi; Akihiko Yamano, Sagamihara; Masahiro Tagawa, Isehara, all of Japan

[73] Assignee: Canon Kabushiki Kaisha, Tokyo, Japan

[21] Appl. No.: 201,430

[22] Filed: Feb. 24, 1994

[30] Foreign Application Priority Data

Feb. 25, 1993 [JP] Japan ................... 5-037029
May 18, 1993 [JP] Japan ................... 5-115892

[51] Int. Cl.$^6$ ................... G11B 9/00; G01N 21/86
[52] U.S. Cl. ................... 369/126; 250/548; 250/307; 250/310
[58] Field of Search ................ 369/126; 365/118, 157, 365/151; 250/307, 309, 310, 311, 548, 557

[56] References Cited

U.S. PATENT DOCUMENTS

| | | | |
|---|---|---|---|
| 4,343,993 | 8/1982 | Binnig et al. | 250/306 |
| 4,575,822 | 3/1986 | Quate | 365/174 |
| 4,724,318 | 2/1988 | Binnig | 250/306 |
| 4,945,515 | 7/1990 | Ooumi et al. | 369/126 |
| 5,130,554 | 7/1992 | Nose et al. | 250/548 |
| 5,220,555 | 6/1993 | Yanagisawa et al. | 369/126 |
| 5,289,455 | 2/1994 | Kuroda et al. | 369/126 |
| 5,313,451 | 5/1994 | Yagi et al. | 369/126 |
| 5,321,685 | 6/1994 | Nose et al. | 369/126 |
| 5,329,515 | 7/1994 | Kawagishi et al. | 369/126 |

FOREIGN PATENT DOCUMENTS

| | | |
|---|---|---|
| 0112401 | 7/1984 | European Pat. Off. . |
| 0247219 | 12/1987 | European Pat. Off. . |
| 63-161552 | 7/1988 | Japan . |
| 63-161553 | 7/1988 | Japan . |
| 3293908 | 12/1991 | Japan . |
| 484750 | 3/1992 | Japan . |
| 5109131 | 4/1993 | Japan . |
| 5250734 | 4/1993 | Japan . |

OTHER PUBLICATIONS

Proceedings of the IEEE, "Silicon as a Mechanical Material", by Kurt E. Petersen, pp. 420–457, May 1982.

*Primary Examiner*—Eugene R. LaRoche
*Assistant Examiner*—Tan Nguyen
*Attorney, Agent, or Firm*—Fitzpatrick, Cella, Harper & Scinto

[57] ABSTRACT

An information processing apparatus includes first, second and third upper electrodes provided on a first substrate, and first, second and third lower electrodes provided on a second substrate opposed to the first, second and third upper electrodes, respectively. Also provided are first, second and third detectors for detecting a first capacitance between the first upper and lower electrodes, a second capacitance between the second upper and lower electrodes and a third capacitance between the third upper and lower electrodes. In addition, the apparatus also includes a first driver for moving the first and second substrates relative to each other in a first direction with respect to the substrate surfaces, a second driver for moving the first and second substrates relative to each other in a second direction perpendicular to the first direction, a third driver for rotating the first and second substrates relative to each other about an axis in a third direction perpendicular to the first and second directions, and a control unit.

9 Claims, 15 Drawing Sheets

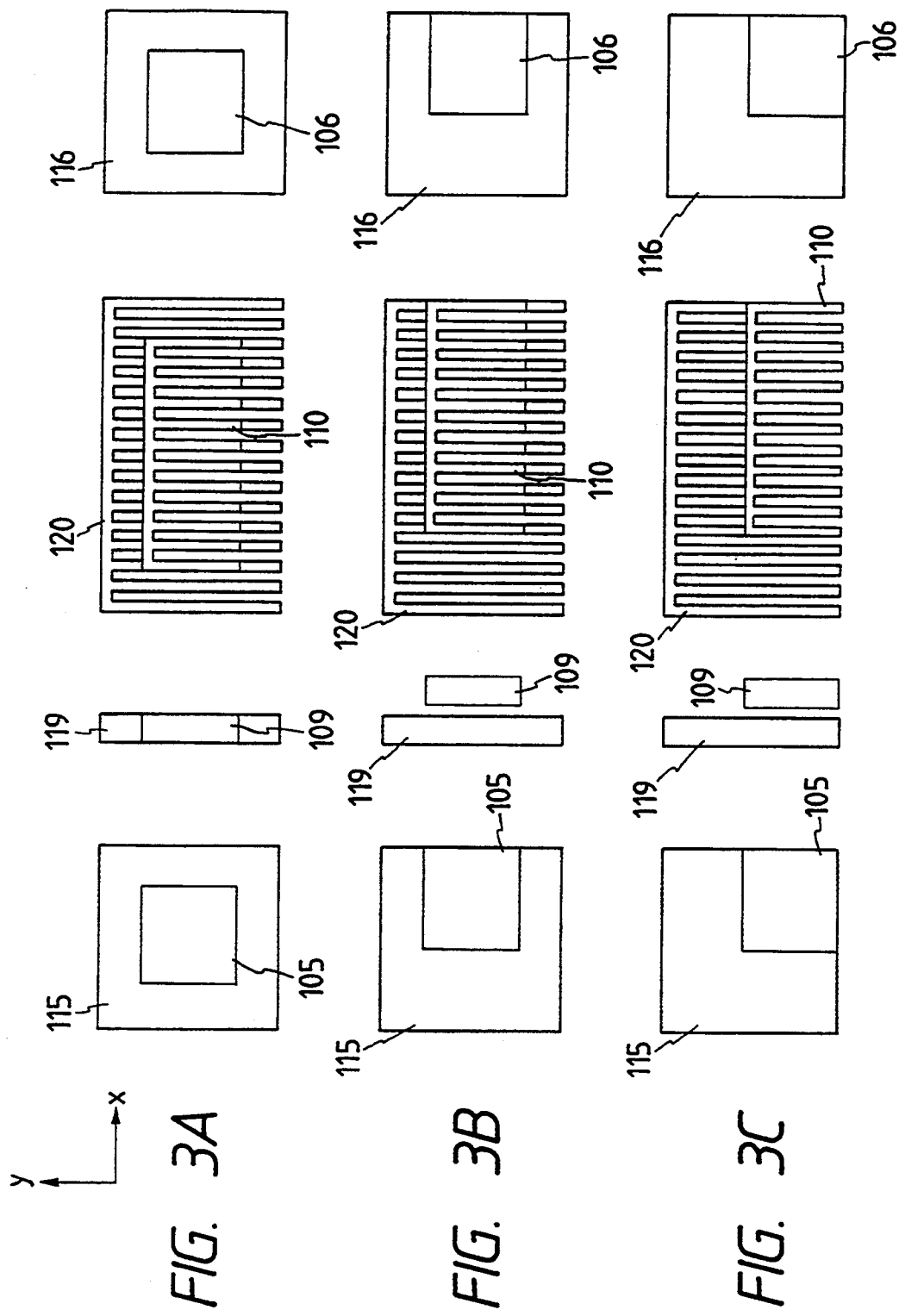

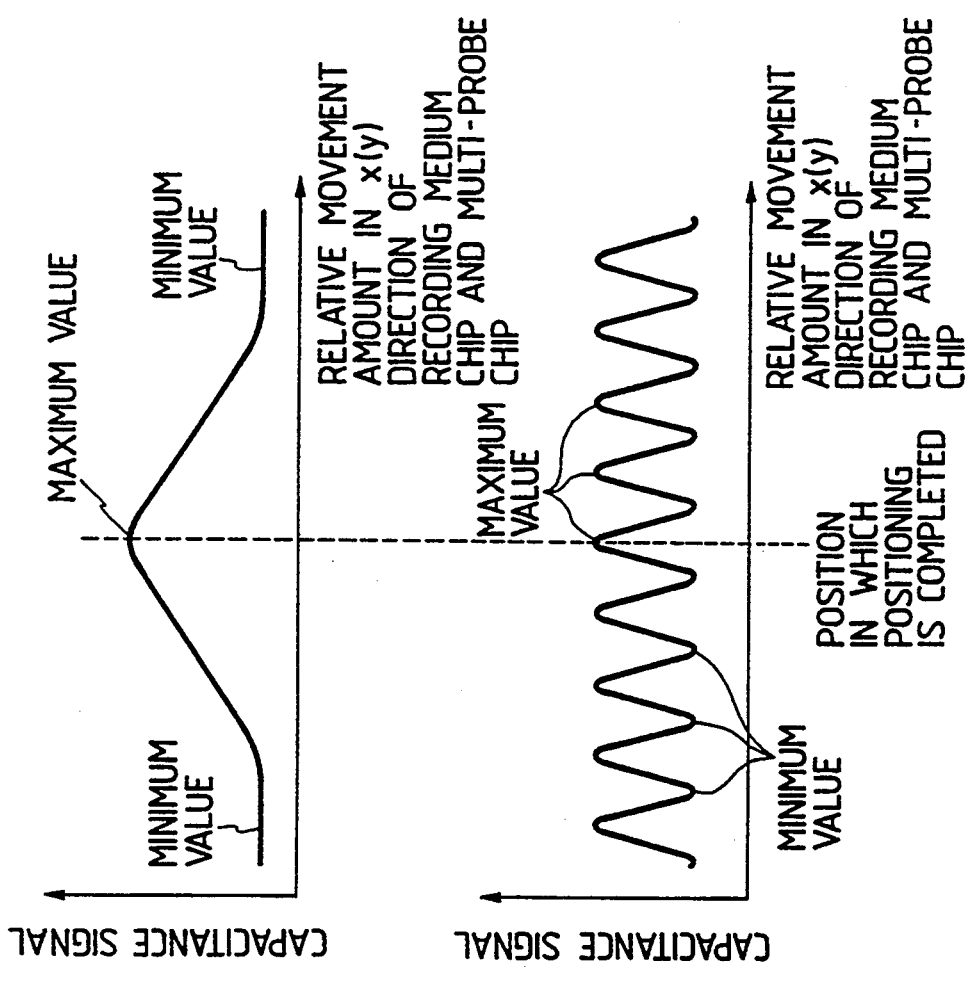

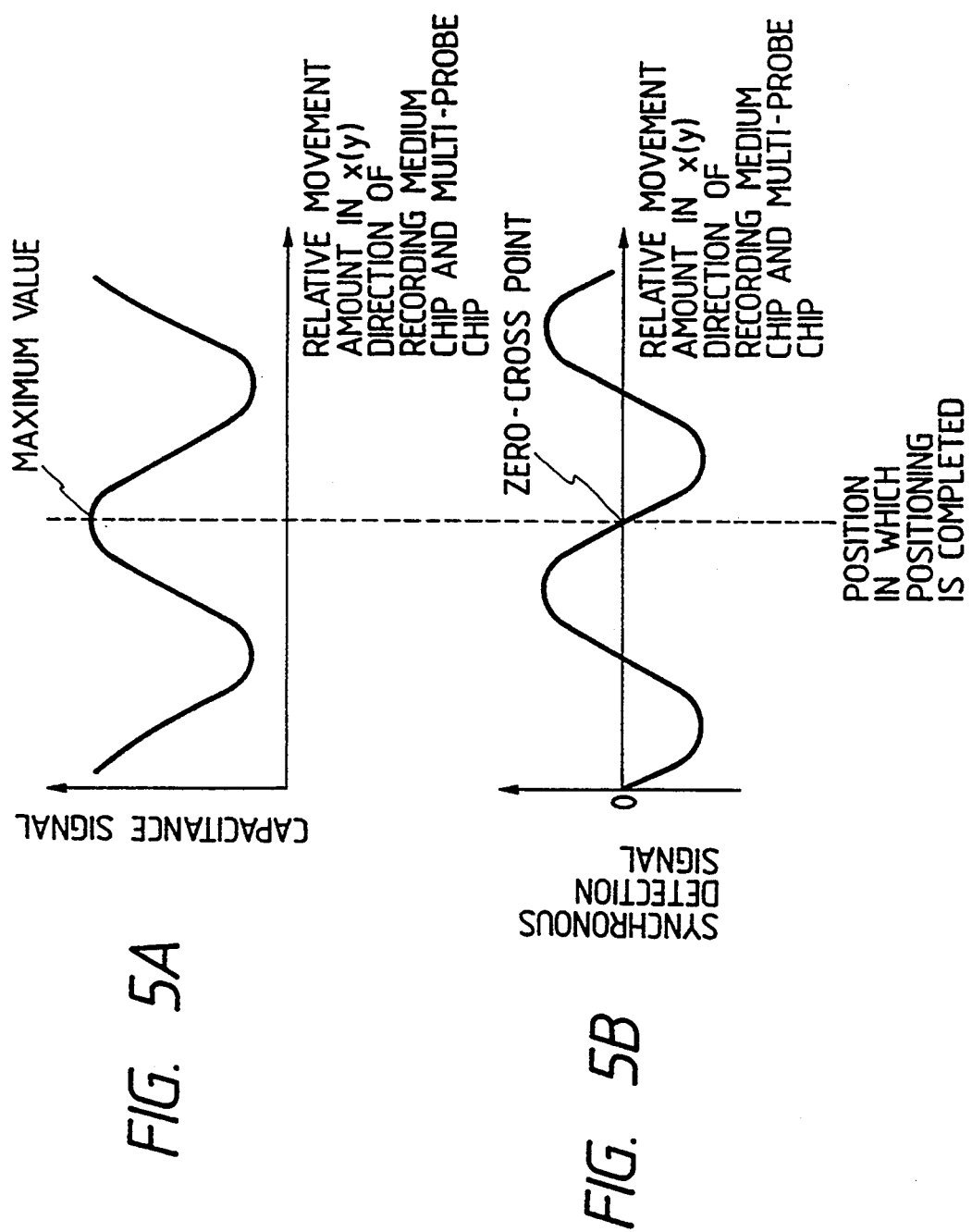

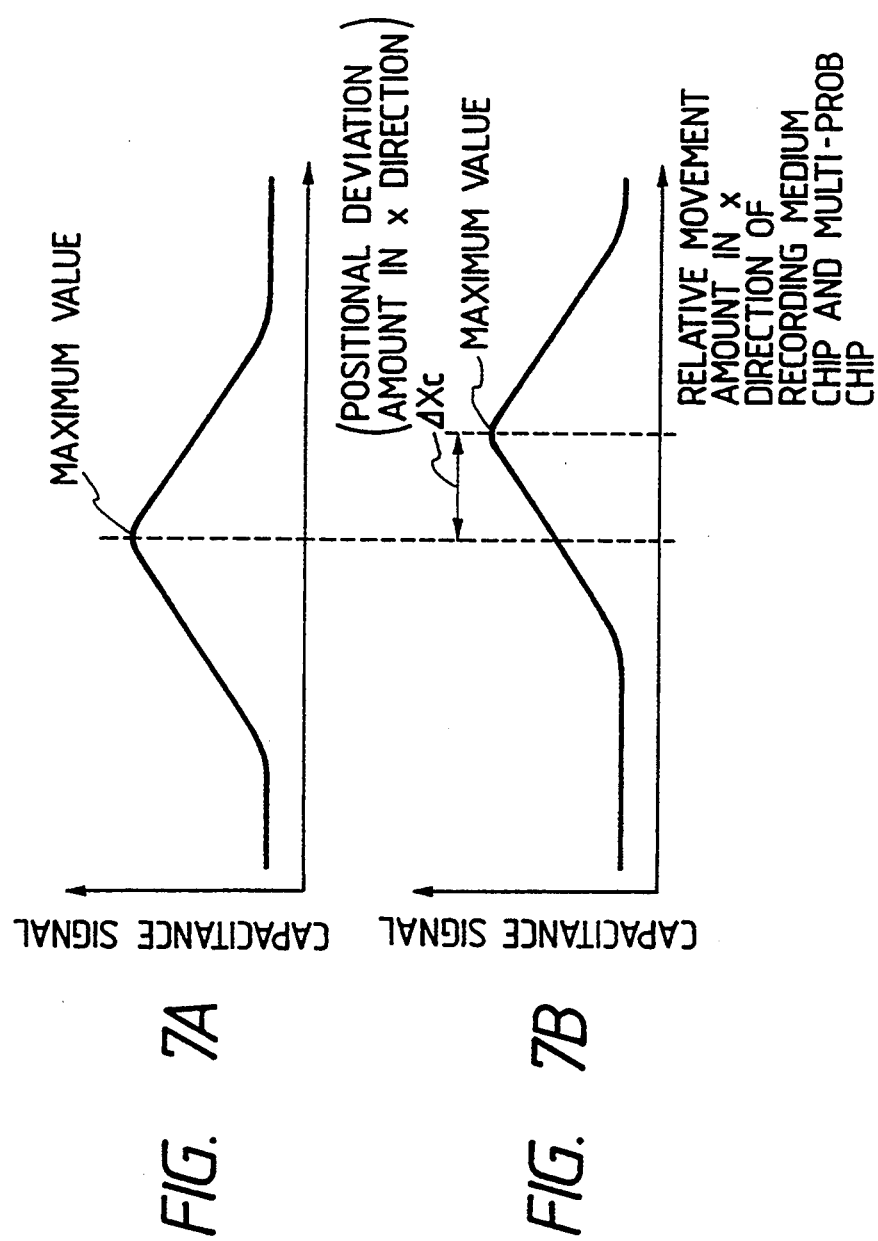

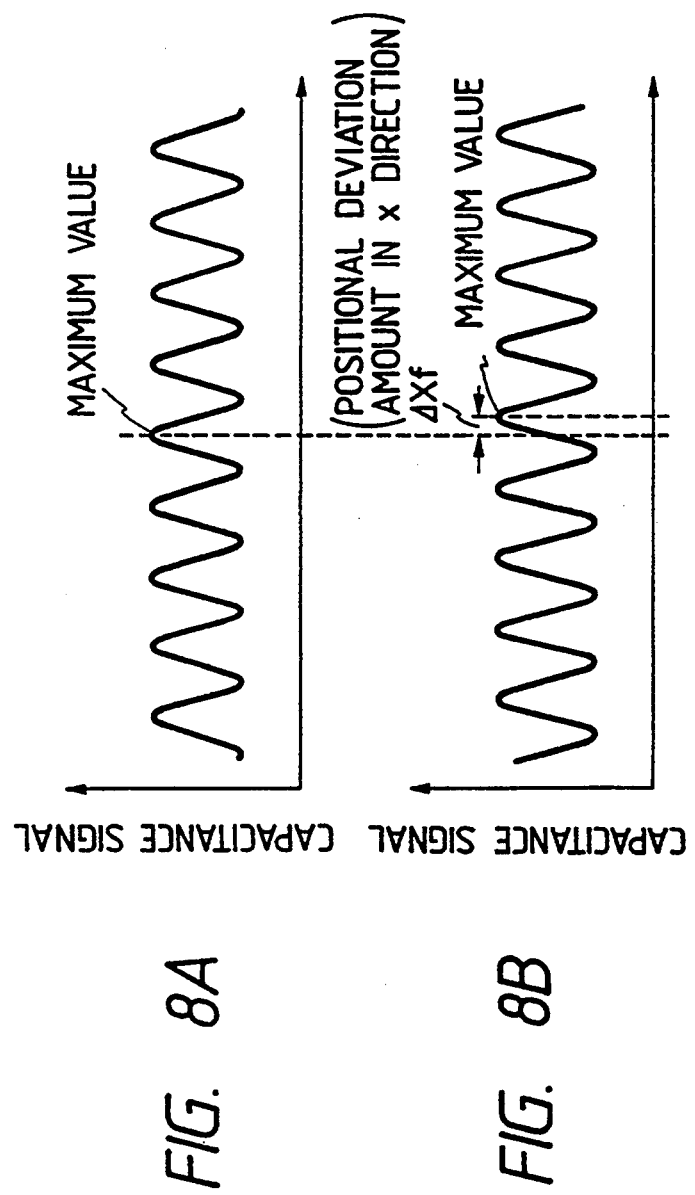

INFORMATION PROCESSING APPARATUS PROVIDED WITH SURFACE ALIGNING MECHANISM BETWEEN PROBE HEAD SUBSTRATE AND RECORDING MEDIUM SUBSTRATE

BACKGROUND OF THE INVENTION

1. Field of the Invention

The present invention relates to an image processing apparatus for recording or reproducing information by a probe or probes disposed about one nanometer close to a recording medium, applying the principle of a scanning probe microscope. More particularly, the invention relates to a surface-aligning mechanism between a recording medium substrate and a probe head substrate in such an apparatus.

It should be noted that the information processing apparatus of the present invention includes all apparatus which perform only the recording of information, which perform only the reproduction of information, or which perform both recording and reproduction of information.

2. Related Background Art

There has recently been developed a scanning tunneling microscope (hereinafter referred to as STM), for example as described in U.S. Pat. No. 4,343,993, which permits a surface of conductive material to be observed with a resolution of below a nanometer. Using the STM, the atomic arrangement on a surface of a metal or semiconductor material or the orientation of organic molecules is observed on the scale of an atom or molecule. Also, the STM technology has been expanded to develop an atomic force microscope (hereinafter referred to as AFM) or a near field optical microscope (hereinafter referred to as NFOM) which permits a surface of an insulating material to be observed with the resolution of the same order as that of STM (see U.S. Pat. No. 4,724,318, or European Patent Application Publication No. EP-0112401-A). Then, it was also suggested that, applying the principle of a scanning probe microscope (hereinafter referred to as SPM) such as the STM, the AFM or the NFOM, data be recorded or reproduced in or from a recording medium while keeping a probe close to the recording medium on the scale of an atom or molecule to create a high-density memory (see U.S. Pat. No. 4,575,822, or Japanese Laid-open Patent Application Nos. 63-161552 and 63-161553).

Further, European Patent Application Publication No. EP-0247219-A discloses an apparatus in which a plurality of probes are formed on a semiconductor substrate for the purpose of miniaturization and a recording medium opposing the substrate is displaced to record data therein. In the apparatus, the probes for detecting a tunnel current are provided on respective cantilevers formed by the semiconductor process and the recording medium facing the probes is set on a cylindrical piezoelectric element to record or reproduce data by a circular motion thereof.

In case a multi-probe array head having a plurality of probe electrodes makes access to a recording medium, a probe head substrate and a recording medium substrate must be set parallel to each other. The distance between the two substrates is normally set to 1 to 3, $\mu$m. Further, the dispersion of the distance needs to be not more than +0.5 $\mu$m. Then, Japanese Patent Application No. 4-84750 discloses an apparatus in which there are plate electrodes for capacitance detection as provided on the probe head substrate and on the recording medium substrate to detect a capacitance therebetween and in which a distance between the two substrates and a tilt thereof are adjusted to make the capacitances equal to each other at a certain value.

In addition, when data is recorded or reproduced by scanning the surface of a recording medium with the probe head, positioning (surface alignment) must be conducted between the probe head and the recording medium in directions in the surface of recording medium. For this, Japanese Patent Application No. 3-293908 discloses an apparatus in which plate electrodes for capacitance detection are provided on the probe head substrate and on the recording medium substrate similarly as in the above apparatus to detect a capacitance therebetween and in which the relative position between the two substrates are adjusted in directions in the surface thereof to maximize the value of capacitance, i.e., to maximize an area of overlap between the plate electrodes in the in-plane directions.

However, the above conventional apparatus, which adjusts the relative position in the in-plane directions between the probe head substrate and the recording medium substrate, has the following problems, because the relative rotation of the two substrates is carried out after the rotation center of the probe head substrate has been aligned by in-plane movement with the rotation center of the recording medium substrate. Even after the rotation center of the probe head substrate is aligned with the rotation center of the recording medium substrate, a fine positional deviation exists in the in-plane directions between both rotation centers and an actual rotation center of a relative rotation driving mechanism. The in-plane positional deviation sometimes causes a positional deviation in the in-plane directions between the rotation center of the probe head substrate and the rotation center of the recording medium substrate during actual driving causing relative rotation. This reduces the accuracy of adjustment of the relative position of the rotation, which often results in lowering the accuracy of adjustment of the relative position in the in-plane directions.

The adjustment of the relative position in the in-plane directions requires at least two pairs of plate electrodes for capacitance detection to define two directions, e.g., the X direction and the Y direction. The plate electrodes may be rectangular or circular. In actual positioning, it is difficult to align the substrates with each other at high accuracy at once. Then, there are often provided plate electrodes for coarse adjustment and plate electrodes for fine adjustment. Therefore, at least four pairs of plate electrodes are necessary for high-accuracy positioning.

Meanwhile, there are a lot of elements formed on the multi-probe array head having a plurality of probe electrodes. FIG. 1 is a perspective view to show a probe unit 9 produced using the semiconductor fabrication process technology. A piezoelectric bimorph cantilever 8, which is a tongue-shaped, finely moving mechanism, is supported at one end on a single crystal silicon substrate 10 and a probe electrode 7 is formed at the free end of the piezoelectric bimorph cantilever 8, thus forming the probe unit 9. The piezoelectric bimorph cantilever 8 has a layered structure, in which an electrode 1, a piezoelectric layer 2, an electrode 3, a piezoelectric layer 4 and an electrode 5 are laminated in this order from the silicon substrate 10 side. An output electrode 6 is provided for each of the electrodes 1, 3, 5. When a voltage is applied through the output electrode 6 to the electrode 1, 3, 5, the piezoelectric layer 2, 4 contracts or expands, whereby the probe electrode 7 can be freely displaced in a direction perpendicular to the surface of silicon substrate 10 (in the Z direction) or in the X and Y directions parallel to the surface of silicon substrate 10. A lot of such probe units 9 are integrated on the silicon substrate 10 to form the multi-probe array head. A part of a drive circuit for the probe units 9 is also formed on the silicon substrate 10.

As described above, many elements are formed in the multi-probe array head, for example seven wiring lines necessary for a single probe unit 9, as shown in FIG. 1. Thus, only the arrangement of wiring lines requires a considerable region on the substrate. In addition to that, additional pairs of plate electrodes and wiring lines therefor are necessary for position detection, which makes the lines even more dense. This can cause cross-talk between the lines. Such noise greatly spoils the reliability of the apparatus when detecting a weak current, such as the tunnel current.

SUMMARY OF THE INVENTION

The present invention has been developed taking the above problems into consideration. It is an object of the present invention to provide an information processing apparatus with high accuracy of adjustment of the relative position between a probe head substrate and a recording medium substrate in the in-plane directions.

Also, it is a further object of the present invention to provide an information processing apparatus in which plate electrodes for capacitance detection are provided on a probe head substrate and on a recording medium substrate to adjust the relative position therebetween, which causes no cross-talk between lines on the substrate.

The above objects can be achieved by an information processing apparatus in which a surface of a first substrate having at least one probe for recording or reproduction is aligned with a surface of a second substrate supporting a recording medium. The apparatus performs at least one of recording and reproduction of information on the medium by the probe, and comprises:

first, second and third upper electrodes provided on the first substrate;

first, second and third lower electrodes provided on the second substrate opposed to the first, second and third upper electrodes, respectively;

first, second and third detecting means for detecting a first capacitance between the first upper and lower electrodes, a second capacitance between the second upper and lower electrodes and a third capacitance between the third upper and lower electrodes;

first driving means for moving the first and second substrates relative to each other in a first direction with respect to the substrate surfaces;

second driving means for moving said first and second substrates relative to each other in a second direction perpendicular to said first direction with respect to the substrate surfaces;

third driving means for rotating the first and second substrates relative to each other about an axis extending in a third direction perpendicular to the first and second directions; and control means for driving the first driving means to detect a difference of drive amount between a first position where the first capacitance becomes a predetermined value and a second position where the third capacitance becomes a predetermined value, the control means calculating an amount of relative rotational deviation of the first and second substrates about the axis in the third direction from a ratio between the difference of the drive amount and a center distance between the first upper and lower electrodes and the third upper and lower electrodes, and the control means driving the third driving means so as to correct the amount of relative rotational deviation and driving the first and second driving means so as to make the first and second capacitances become equal to respective predetermined values.

Also, the above object can be achieved by an information processing apparatus in which a surface of a first substrate having at least one probe for recording or reproduction is aligned with a surface of a second substrate supporting a recording medium. The apparatus performs at least one of recording and reproduction of information on the medium by the probe, and comprises:

a first electrode provided on the first substrate;

a second electrode provided on the second substrate opposed to the first electrode;

detecting means for detecting a capacitance between the first electrode and the second electrode; and means for moving the first and second substrates relative to each other to align the surface of the first substrate with the surface of the second substrate in accordance with a detection result of the detecting means;

wherein the first electrode and second electrode each have a comb-shaped pattern.

BRIEF DESCRIPTION OF THE DRAWINGS

FIGS. 3A, 3B and 3C are drawings showing states of overlap of upper and lower electrodes with a positional deviation in the x and y directions;

FIG. 4A and FIG. 4B are drawings showing waveforms of a capacitance signal for x (y) position control;

FIG. 5A is a drawing showing a waveform of a capacitance signal for fine position control;

FIG. 5B is a drawing showing a waveform of a synchronous detection signal;

FIGS. 7A and 7B are drawings showing waveforms of capacitance signals for coarse position control with a rotational deviation in the $\theta$ direction;

FIGS. 8A and 8B are drawings showing waveforms of capacitance signals for fine position control with a rotational deviation in the o direction;

DETAILED DESCRIPTION OF THE PREFERRED EMBODIMENTS

Figure 1:
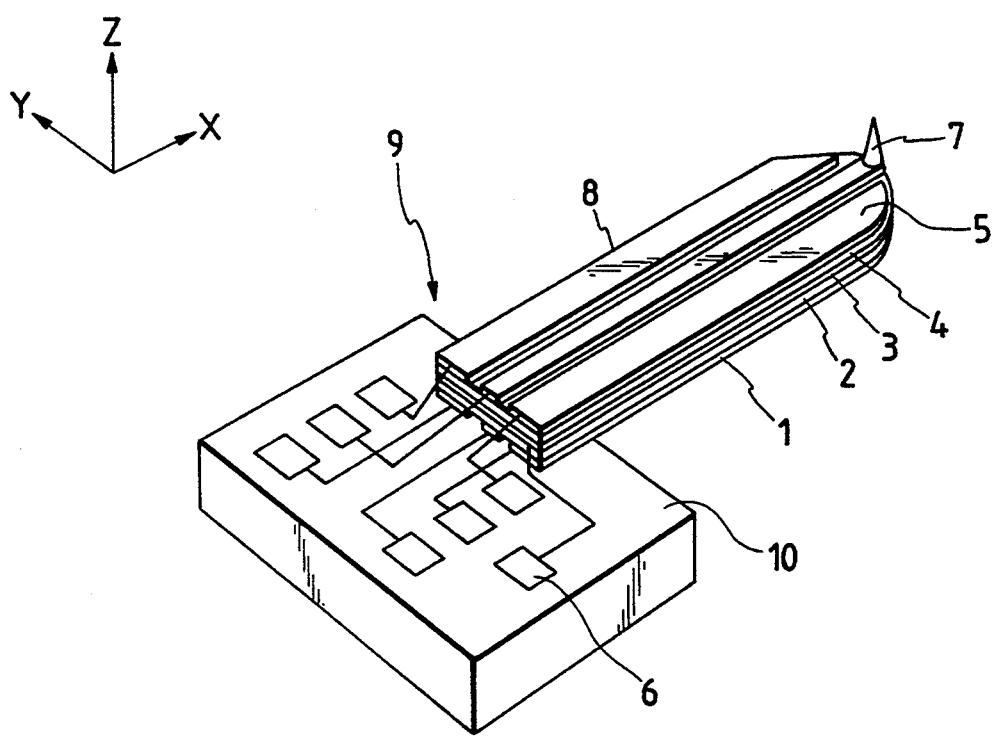
FIG. 1 is a perspective view showing a conventional probe unit.
Figure 2:
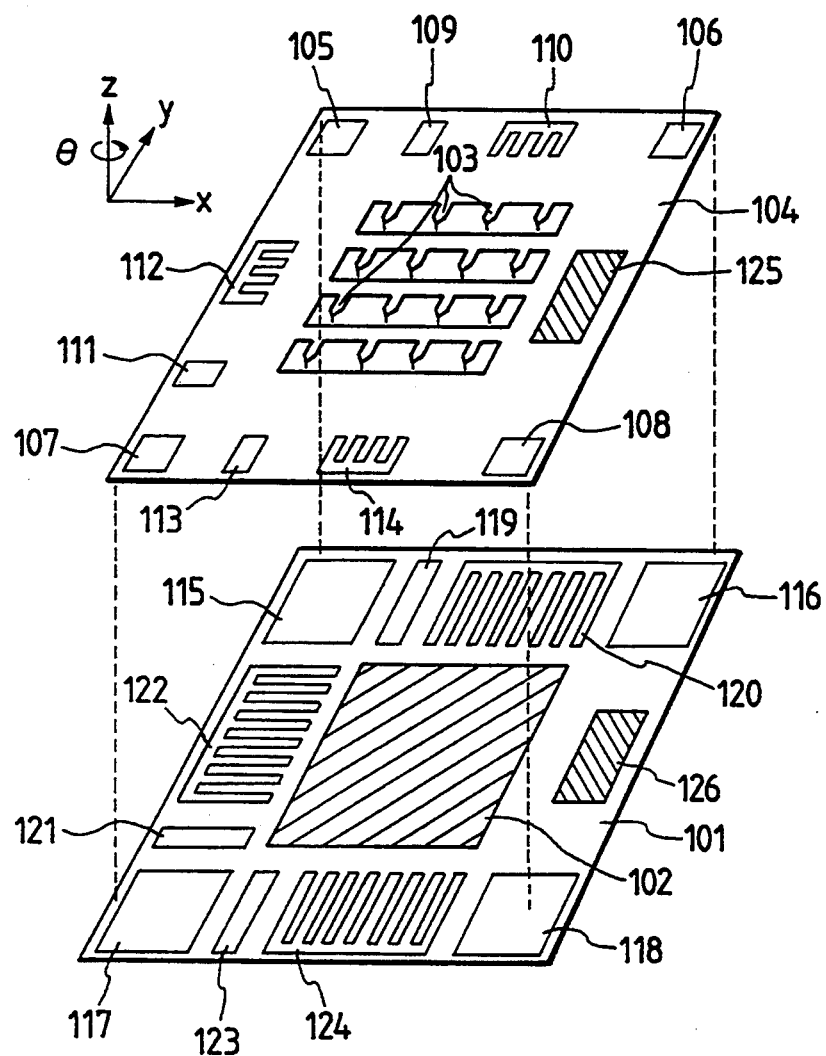
FIG. 2 is a drawing showing a first embodiment of a surface-aligning mechanism in an information processing apparatus of the present invention.

FIG. 2 shows the first embodiment of a surface-aligning mechanism in an information processing apparatus of the present invention. A plurality of probes 103 for high-density recording and reproduction are provided on a multi-probe chip 104 facing a recording medium 102 on a recording medium chip 101. In FIG. 2, there are four upper electrodes for z position control 105, 106, 107, 108, an upper electrode for coarse x position control 109, an upper electrode for fine x position control 110, an upper electrode for coarse y position control 111, an upper electrode for fine y position control 112, an upper electrode for coarse $\theta$ position control 113, and an upper electrode for fine $\theta$ position control 114 provided around the probes on the multi-probe chip 104. Also, there are four lower electrodes for z position control 115, 116, 117, 118, a lower electrode for coarse x position control 119, a lower electrode for fine x position control 120, a lower electrode for coarse y position control 121, a lower electrode for fine y position control 122, a lower electrode for coarse $\theta$ position control 123, and a lower electrode for fine $\theta$ position control 124 provided around the recording medium 102 on the recording medium chip 101. Additionally, an oscillation circuit 125 is integrally integrated on the multi-probe chip 104 to supply an oscillation signal to each of the electrodes 105 to 114 on the multi-probe chip 104 through lines (not shown in FIG. 2) thereon. The above oscillation signal is transmitted to each associated electrode 115 to 124 on the recording medium chip 101 opposed to each electrode 105 to 114 on the multi-probe chip 104 by capacitive coupling with each electrode on the multi-probe chip 104. A capacitance detecting circuit 126 is integrally integrated on the recording medium chip 101. The oscillation signal transmitted to each electrode 115 to 124 is led through an associated line (not shown in FIG. 2) on the recording medium chip 101 to the capacitance detecting circuit 126 to be detected thereby. The amplitude of the oscillation signal is used to detect the magnitude of capacitive coupling, i.e., the capacitance between an electrode on the multi-probe chip 104 and a corresponding electrode on the recording medium chip 101.

The control of the relative position between the recording medium 102 and the probes 103 must be carried out with an accuracy of below 1 $\mu$m in order for a plurality of probes 103 to record or reproduce data with high density and high reliability on or from the recording medium 102. Considering the length of the probe pin set at the distal end of each probe, the control of the relative position between the recording medium chip 101 and the multi-probe chip 104 requires an accuracy level of $\pm 0.1$ $\mu$m in the range of 5 to 30 $\mu$m for control of the z-directional gap in FIG. 2 and an accuracy level of $\pm 0.1$ $\mu$m in the range of $\pm 1000$ $\mu$m for control of positioning in the x and y directions in FIG. 2.

For controlling the z-directional gap and tilt, a capacitance is first detected separately between the upper electrodes for z position control 105, 106, 107, 108 on the multi-probe chip 104 and the lower electrodes for z position control 115, 116, 117, 118 corresponding thereto on the recording medium chip 101. Since the capacitance between electrodes is in a proportional relation with the inverse of the gap between electrodes, the detection of capacitance can permit calculation of the gap between the upper and lower electrodes 105 and 115, between 106 and 116, between 107 and 117, or between 108 and 118. For example, in the case in which the size of the upper electrode is 500 $\mu$m$\times$500 $\mu$m, the size of the lower electrode is 2500 $\mu$m$\times$2500 $\mu$m (the reason why the size of upper electrode is not equal to that of lower electrode will be described later), and the electrode gap is 10 $\mu$m, the capacitance between the electrodes will be 225 fF. It is seen inversely from this that in order to set the electrode gap to 10 $\mu$m and to control it with an accuracy of $\pm 0.1$ $\mu$m, the capacitance of 225 fF should be detected with an accuracy of +2.5 fF and the gap between the recording medium chip 101 and the multi-probe chip 104 should be controlled by drive elements, such as piezo elements, so as to keep the capacitance constant. Also, inclination correction can be made by comparing four capacitances between the upper and lower electrodes for z position control 105 and 115, between 106 and 116, between 107 and 117 and between 108 and 118 with each other and controlling a tilt of clearance between the recording medium chip 101 and the multi-probe chip 104 by the drive elements, such as the piezo elements, to keep the capacitances equal to each other.

Next described is the method for controlling the x-directional or y-directional positioning (surface alignment) mainly as to the x-directional positioning. For the x-directional positioning between the recording medium chip 101 and the multi-probe chip 104, a capacitance is first detected between the upper electrode for coarse x position control 109 and the lower electrode for coarse x position control 119 (the capacitance will be referred to as a coarse x signal), and then coarse positioning is performed with an accuracy of about $\pm 10$ $\mu$m. Subsequently, a capacitance is detected between the upper electrode for fine x position control 110 and the lower electrode for fine x position control 120 (the capacitance will be referred to as a fine x signal), and then fine positioning is performed with an accuracy of $\pm 0.1$ $\mu$m. The degree of overlap between the upper and lower electrodes can be detected from the level of the coarse x signal or the fine x signal. While moving the recording medium chip 101 relative to the multi-probe chip 104 in the x direction, it can be judged that the overlap between the upper and lower electrodes is a maximum, or that the alignment is completed, when the capacitance becomes a maximum. The y-directional alignment is also conducted similarly. A point for positioning does not always have to correspond to the point where the capacitance becomes a maximum, but may be a point where the capacitance reaches a certain value. The following description employs the maximum capacitance for positioning for convenience' sake.

FIGS. 3A, 3B and 3C show states of overlap between the upper and lower electrodes for producing a capacitance. FIG. 3A shows the positional relation between the upper and lower electrodes in a state of alignment end, FIG. 3B the positional relation with an x-directional positional deviation, and FIG. 3C the positional relation with x-directional and y- directional positional deviations.

In FIGS. 3A, 3B and 3C, black solid portions represent the upper electrodes 105, 106, 109, 110 on the multi-probe chip 104 and voided (white) portions represent the lower electrodes 115, 116, 119, 120 corresponding thereto on the recording medium chip 101. The shape of the upper and lower electrodes 109, 119 for coarse control is rectangular with the shorter side extending in the positioning direction (or in the x direction in FIGS. 3A, 3B and 3C). Making the shape shorter in the positioning direction improves the accuracy of positioning, while making the shape longer in the direction perpendicular to the positioning direction (or in the y direction in FIGS. 3A, 3B and 3C) increases the area of the electrodes, which increases the absolute value of a capacitance signal. The upper and lower electrodes for fine control 110, 120 are comb-shaped such that a plurality of rectangular electrode pieces with the longer side extending in the direction perpendicular to the positioning direction (or in the y direction) are arranged at equal intervals in the positioning direction (or in the x direction). Employing this arrangement, the accuracy of positioning is further improved by further shortening the shorter side of each rectangle piece, the area of the electrode is increased by electrically connecting a plurality of rectangular electrode pieces as juxtaposed, so as to increase the absolute value of the capacitance signal, and fine positioning is made possible for each interval by arranging the rectangular electrode pieces at equal intervals.

The lower electrodes for z position control 115, 116 are larger than the upper electrodes for z position control 105, 106, which can avoid decreasing the area of overlap between the upper and lower electrodes and in turn decreasing the capacitance signal as long as an x-directional or y-directional positional deviation occurs within a permissible range (see FIGS. 3B and 3C). Similarly, the lower electrodes for coarse or fine x position control are longer in the direction perpendicular to the positioning direction (or in the y direction) than the upper electrodes for coarse or fine x position control 109, 110, which can avoid decreasing the area of overlap between the upper and lower electrodes and in turn decreasing the capacitance signal as long as an y-directional positional deviation occurs within a permissible range. The number of electrode pieces in the lower electrode for fine x position control 120 is larger in the positioning direction (or in the x direction) than that in the upper electrode for fine x position control 110, which can increase a range (stroke) of fine positioning. For example, suppose the size of the upper electrode for coarse x position control is 100 $\mu m \times 500$ $\mu m$, the size of the lower electrode for coarse x position control is 100 $\mu m \times 2500$ $\mu m$ and the gap between the upper and lower electrodes is 10 $\mu m$. Then the capacitance between the electrodes (coarse x signal) is 45 fF. It is seen inversely from this that a change in the coarse x signal should be detected with an accuracy of $\pm 4.5$ fF in order to perform the coarse x-directional positioning with an accuracy of $\pm 1.0$ $\mu m$. Also, suppose the size of the upper electrode for fine x position control is 10 $\mu m \times 500$ $\mu m$ with 25 electrode pieces arranged at a cycle of 20 $\mu m$ in the x direction, the size of the lower electrode for fine x position control is 10 $\mu m \times 2500$ $\mu m$ with 125 electrode pieces arranged at a cycle of 20 $\mu m$ in the x direction, and the gap between the upper and lower electrodes is 10 $\mu m$. Then the capacitance between the electrodes (fine x signal) is 112.5 fF. It is seen inversely from this that a change in the fine x signal should be detected with an accuracy of $\pm 1$ fF in order to perform the fine x-directional positioning with an accuracy of $\pm 0.1$ $\mu m$.

FIG. 4A and FIG. 4B show actual waveforms of the coarse x signal and the fine x signal, respectively. While the coarse x signal changes from the minimum value through the maximum value to the minimum value with relative movement between the recording medium chip 101 and the multi-probe chip 104, the fine x signal goes up and down between the minimum value and the maximum value at a cycle of the pitch of electrode pieces arranged in the x direction. The maximum value of the coarse x signal is converted into an amount of x-directional positional deviation and is detected at an accuracy of below the cycle of the fine x signal, whereby a specific maximum value in the fine x signal corresponding to the maximum value of the coarse x signal can be detected out of a plurality of maximum values in the fine x signal. The recording medium chip and the multi-probe chip can be positioned with a high accuracy in the x direction with each other by accurately detecting the specific maximum value in the fine x signal.

The synchronous detection method is employed to improve the detection accuracy of the maximum value of the capacitance signal such as the fine x signal. FIGS. 5A and 5B are drawings to show signal waveforms in the synchronous detection method. The synchronous detection method is as follows. The recording medium chip 101 and the multi-probe chip 104 are relatively vibrated in the x direction (at frequency f). A change in the capacitance signal due to the vibration is synchronously detected by a reference signal of frequency f. A maximum value of the capacitance signal (or minimum value) is detected from the zero-cross point of the synchronous detection signal (which is a point where the phase of the change in the capacitance signal is inverted with respect to the phase of a reference signal). Using the synchronous detection method lowers the detection speed but improves the detection accuracy, normally up to one tenth as compared with a method of directly detecting the maximum value. In case of the above numerical example, the zero-cross point of the synchronous detection signal was able to be detected with an accuracy of not more than $\pm 0.1$ $\mu m$ in such an arrangement that the recording medium chip 101 and the multi-probe chip 104 were relatively vibrated at a frequency f=100 Hz and with an amplitude 1 $\mu m$ in the x direction by a drive element such as the piezo element (see FIG. 11), that the capacitance signal and the reference signal were input into a lock-in amplifier, and that the synchronous detection signal was passed through a low-pass filter with a band width of 1 Hz to be then detected. Accordingly, the recording medium chip 101 and the multi-probe chip 104 were able to be positioned relative to each other with an accuracy of ±0.1 μm for each 20 μm in the range of ±1000 μm in the x-direction. The above description concerned an example of x-directional positioning, but the same method can be applied to the y-directional positioning.

In some cases where the recording medium chip 101 and the multi-probe chip 104 are moved relative to each other in the x (y) direction in the above positioning, drive or mounting errors of drive elements or guides could also cause relative movement in the z direction so as to change the gap between the recording medium chip 101 and the multi-probe chip 104.

Figure 6A:
FIGS. 6A, 6B and 6C are drawings showing waveforms of a capacitance signal for position control with a tilt between a recording medium chip and a multi-probe chip.
Figure 6B:
Figure 6C:
Figure 6D:
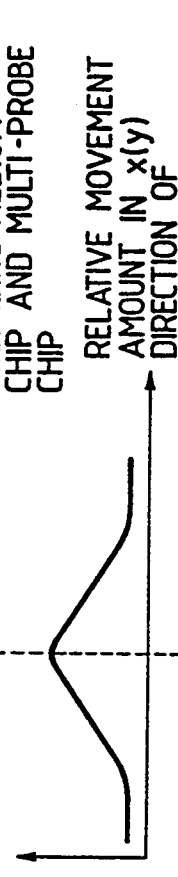
FIGS. 6D and 6E are drawings showing waveforms of normalized signals obtained by normalizing the signals shown in FIGS. 6A and 6B.
Figure 6E:
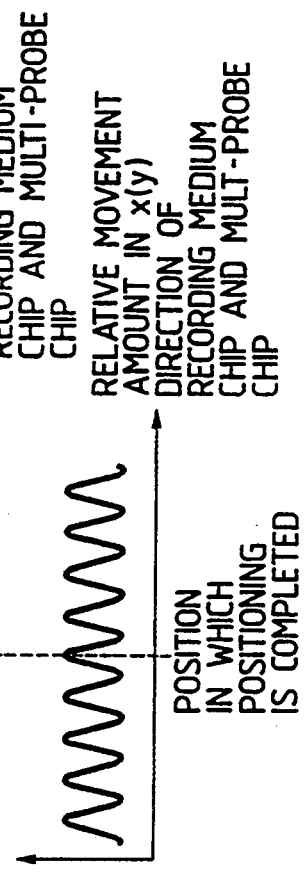

FIGS. 6A, 6B and 6C show an example of signal waveforms in such cases, i.e., a capacitance signal $C_1$ between the upper and lower electrodes for coarse x (y) position control 109 and 119 (hereinafter referred to as coarse x (y) signal), a capacitance signal $C_2$ between the upper and lower electrodes for fine x (y) position control 110 and 120 (hereinafter referred to as fine x (y) signal), and a capacitance signal $C_3$ between the upper and lower electrodes for z position control 106 and 116 (hereinafter referred to as a z signal), respectively. If the relative z-directional (gap) movement also occurs with the relative movement in the x (y) direction as described, the capacitance changes when the gap changes, because the capacitance in the x or y direction is in inverse proportion to the gap in the z direction. The change produces an error in the detection of the maximum value of the capacitance signal in the control of positioning in the x and y directions, which will be a factor to reduce the accuracy of positioning. In order to avoid it, a normalization is made by dividing the coarse x (y) signal and fine x (y) signal (waveforms $C_1$ and $C_2$ in FIGS. 6A and 6B) by the z signal (waveform $C_3$ in FIG. 6C) (to obtain waveforms $C_1/C_3$ and $C_2/C_3$ as shown in FIGS. 6D and 6E). Also employing the same normalization for a signal in the $\theta$ direction as that for the signal in the x (y) direction, capacitance signals for the x, y and $\theta$ directions can be obtained without being affected by the gap change in the z direction, thus enabling high-accuracy positioning.

Next described is a control method of $\theta$-directional positioning (surface alignment), which is a rotation about the z axis. The $\theta$-directional positioning is carried out as follows. When capacitances (coarse x signal and fine x signal) between the upper and lower electrodes for coarse and fine x position controls, i.e., when capacitances between 109 and 119 and between 110 and 120 are detected, capacitances between the upper and lower electrodes for coarse and fine $\theta$ position controls, i.e., when the capacitances between 113 and 123 and between 114 and 124 (hereinafter referred to as the coarse $\theta$ signal and fine $\theta$ signal, respectively), are detected at the same time to calculate an x positional deviation between a maximum value in the coarse (fine) x signal and a maximum value in the coarse (fine) $\theta$ signal (see FIGS. 7A and 7B and FIGS. 8A and 8B). The thus calculated x positional deviation is denoted by $\Delta x$. Let d be a distance in the y direction between the electrodes for coarse and fine x position controls and the electrodes for coarse and fine $\theta$ position controls (a distance between the centers of electrode patterns), which can be preliminarily obtained. Then, a ratio $\Delta x/d$ represents a rotational position deviation as an angle in the $\theta$ direction. The rotational position deviation can be corrected by rotating the recording medium chip 101 and the multi-probe chip 104 in the $\theta$ direction relative to each other by a drive element such as the piezo element. Since the center of rotation is generally different from the center of the recording medium chip 101 or the multi-probe chip 104, a relative positional deviation occurs in the x direction or in the y direction with the rotation in the $\theta$ direction. It is thus necessary for the rotational position deviation to be corrected in combination with the correction of the x and y positional deviations.

Figure 11:
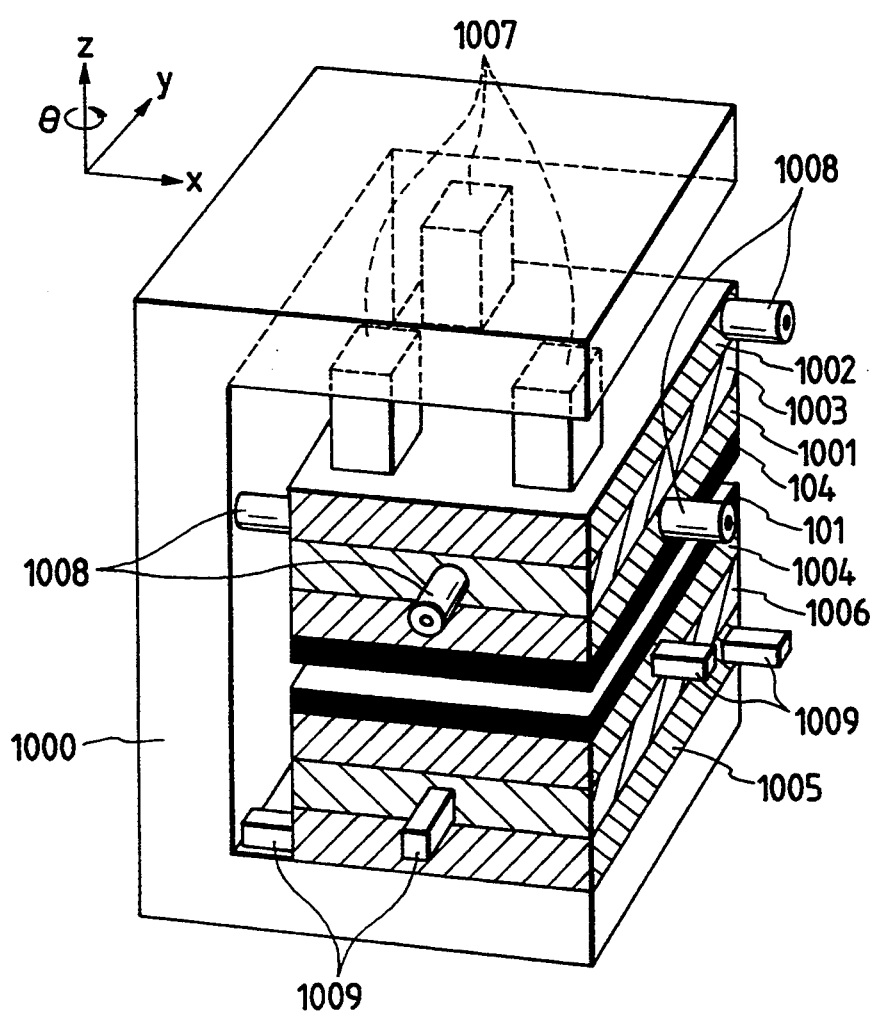
FIG. 11 is a conceptual illustration showing the structure of x, y, z and $\theta$ directional driving mechanism in an information processing apparatus of the present invention.

The procedure of positioning is next described referring to FIG. 11. FIG. 11 is a drawing to conceptually show the structure of $xy\theta$ drive mechanism. In FIG. 11, numeral 1000 designates a housing. In order to move the recording medium chip 101 and the multi-probe chip 104 as opposed parallel to each other at a certain clearance, relative to each other, there are provided in the housing 1000 an x finely moving mechanism 1004, a $\theta$ finely moving mechanism 1005, and a y finely moving mechanism 1006 for finely moving the recording medium chip 101 in the respective directions, and a piezo element 1009 as a drive source therefor; an x coarsely moving mechanism 1001, a $\theta$ coarsely moving mechanism 1002, and a y coarsely moving mechanism 1003 for coarsely moving the multi-probe chip 104 in the respective directions, and a motor 1008 as a drive source therefor, further a driving mechanism composed of a piezo element 1007 for adjusting the clearance between the recording medium chip 101 and the multi-probe chip 104 and a tilt thereof.

First, the x coarsely moving mechanism 1001, which is, for example, a DC servo motor or a stepping motor, is driven to drive the recording medium chip 101 and the multi-probe chip 104 relative to each other in the x direction, and maximum positions of a coarse x signal and a coarse $\theta$ signal are detected to calculate a positional deviation $\Delta x_c$ of a maximum value, as shown in FIG. 7B. An amount of coarse $\theta$ rotational deviation is calculated based on the thus calculated positional deviation $\Delta x_c$ with the known distance d as described above. The $\theta$ coarsely moving mechanism 1002 is driven according to the thus calculated amount of coarse $\theta$ rotational deviation to effect coarse correction of $\theta$ rotational deviation. The x coarsely moving mechanism 1001 is again driven and is stopped at the maximum position of the coarse x signal. Similarly, the y coarsely moving mechanism 1003 is driven and is then stopped at the maximum position of the coarse y signal. Next, the x finely moving mechanism 1004, which is, for example, a piezo element, is driven to relatively vibrate the recording medium chip 101 and the multi-probe chip 104 in the x direction. Keeping this state, the x coarsely moving mechanism 1001 is driven to detect zero-cross points corresponding to the positioning end positions of a synchronous detection signal of a fine x signal and a synchronous detection signal of a fine $\theta$ signal and then to calculate an amount of positional deviation between the zero-cross points (and then the relative x-direction vibration is stopped). An amount of fine $\theta$ rotational positional deviation $\Delta x_f$ ( see FIG. 8B) is calculated based on the thus calculated positional deviation amount. The $\theta$ coarsely moving mechanism 1002 and the $\theta$ finely moving mechanism 1005 are driven according to the thus calculated amount to finely correct the $\theta$ rotational deviation. The x finely moving mechanism 1004 is again driven for relative vibration in the x direction. Keeping this state, the x coarsely moving mechanism 1001 is driven and is stopped at the position of a zero-cross point of a synchronous detection signal of a fine x signal. A linear drive (direct current drive) may be used for fine x positioning near the zero-cross point in addition to a vibratory drive (alternate current drive) of the x finely moving mechanism 1004. The relative x-directional vibration is stopped after the end of fine positioning in the x direction. Finally, the y finely moving mechanism 1006 is driven to relatively vibrate the recording medium chip 101 and the multi-probe chip 104 in the y direction. Keeping this state, the y coarsely moving mechanism 1004 is driven and stopped at the position of a zero-cross point of a synchronous detection signal of a fine y signal. A linear drive of the y finely moving mechanism 1006 may be used for fine positioning in the y direction near the zero-cross point, similiar to that for x direction. The relative y-directional vibration is stopped after the end of fine positioning in the y direction. The above procedure completes the coarse and fine positioning process for three axes in the x, y and $\theta$ directions.

Next described is the procedure of relative movement (in the x and y directions) of the recording medium chip 101 and the multi-probe chip 104. First, with a current position as the reference, the x coarsely moving mechanism 1001 is driven to effect relative x-directional movement by a desired amount which is a multiple of the x-directional interval of electrode pieces in the electrode for fine x position control. After that, the y coarsely moving mechanism 1003 is driven to effect relative y-directional movement by a desired amount which is a multiple of the y-directional interval of electrode pieces in the electrode for fine y position control. Subsequently, the x finely moving mechanism 1004 is driven to relatively vibrate the recording medium chip 101 and the multi-probe chip 104 in the x direction. Keeping this state, the x coarsely moving mechanism 1001 is then driven and stopped at the position of a zero-cross point of a synchronous detection signal of a fine x signal near the position of relative movement. Then, the relative x-directional vibration is stopped. Finally, the y finely moving mechanism 1006 is driven in the y direction in the same manner as in the x direction to effect relative y-directional vibration. Keeping this state, the y coarsely moving mechanism 1003 is driven and stopped at the position of a zero-cross point of a synchronous detection signal of a fine y signal near the position of relative movement. After that, the relative y-directional vibration is stopped. The above steps complete the relative movement for each predetermined interval in the x and y directions.

Figure 9:
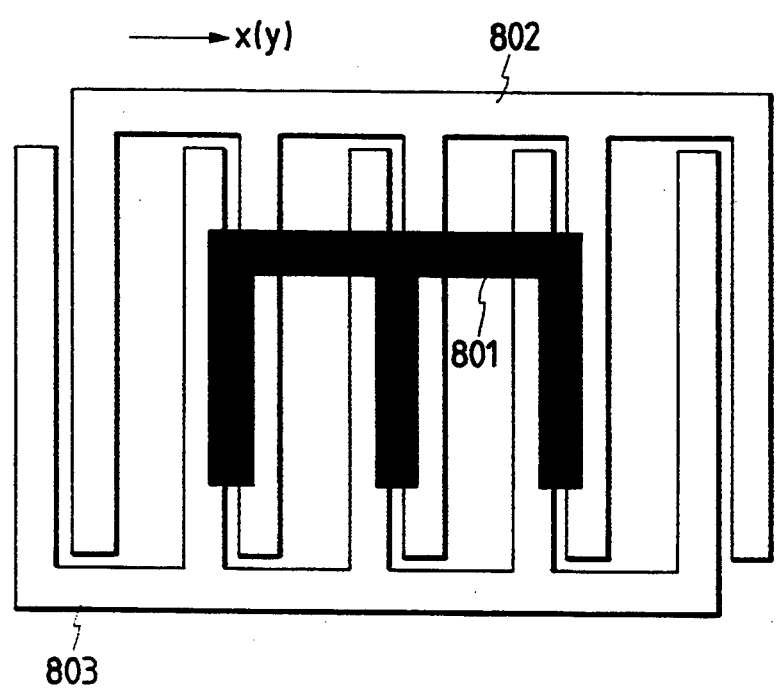
FIG. 9 is a drawing showing an arrangement of half-split lower electrodes for fine position control.
Figure 10:
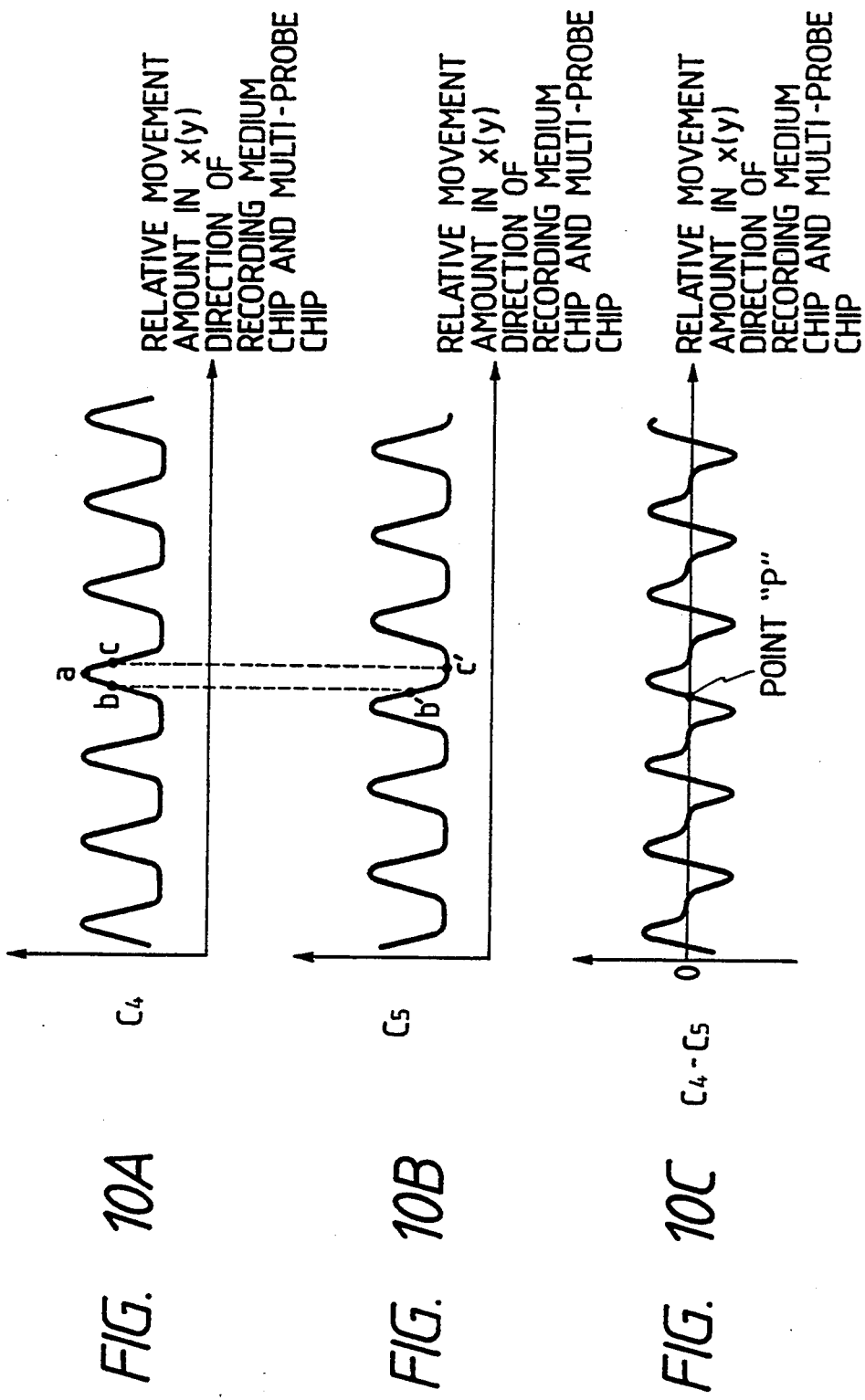
FIGS. 10A and 10B are drawings showing waveforms of capacitance signals in the case of the half-split lower electrodes for fine position control being employed.
FIG. 10C is a drawing showing a waveform of a difference signal between the signals shown in FIGS. 10A and 10B.

In the positioning apparatus as described above, the shapes of the lower electrodes for fine x, y and $\theta$ position controls were described with the example of simple comb shape. In actual applications, the lower electrodes each will be formed of two such comb-shaped electrodes meshed with each other and arranged such that a ratio between the x (y)-directional width of an electrode piece, which is a tooth in the comb, and a clearance between two adjacent electrode pieces is not 1:1 but 1:2 to 3, as shown in FIG. 9. FIG. 9 shows a state in which the upper electrode 801 overlaps with the two lower electrodes 802 and 803 in symmetry. This arrangement permits high-accuracy differential positioning by simultaneously and independently detecting a capacitance signal between the upper electrode 801 and the lower electrode 802 and a capacitance signal between the upper electrode 801 and the lower electrode 803 and taking a difference between the two signals. Also, a direction of relative positional deviation between the recording medium chip and multi-probe chip can be detected by comparing phases of the two signals with each other. These will be explained referring to the actual signal waveforms as shown in FIGS. 10A and 10B. The capacitance signal $C_4$ between the upper electrode 801 and the lower electrode 802 and the capacitance signal $C_5$ between the upper electrode 801 and the lower electrode 803 each have a waveform in which a constant offset component regardless of the relative movement is added to a component periodically changing its amplitude (which is an intrinsic signal component) as shown in FIGS. 10A and 10B. Primary factors of the offset component are a component regardless of the relative movement in the capacitance signal between the upper electrode and the lower electrode, a component due to capacitances between lines on the chip, and a component due to an error of a capacitance detecting circuit. In case of the positioning using such capacitance signals, the maximum value may be detected using the synchronous detection method as described previously, but the positioning can be made more easily and accurately to some extent by detecting an intermediate value between the maximum value and the minimum value, where the slope of the signal is steep. It is, however, difficult for an intermediate value to be detected with high accuracy, because the capacitance signals have the offset component as described above and the amplitude thereof changes depending upon the gap between the upper and lower electrodes in the z direction. Then, positioning is made using a difference signal ($C_4-C_5$) between the capacitance signal $C_4$ and the capacitance signal $C_5$. The detection of the zero-cross point (for example the point P in FIG. 10C) as shown in FIG. 10C can be done with high accuracy because the slope of the signal is steep. Also, the offset components cancel each other by taking a difference between the two capacitance signals, enabling positioning at a point free of a gap change in the z direction. As for the detection of the direction of relative positional deviation, for example supposing the positioning is intended to the point a at the maximum value of the capacitance signal $C_4$ in FIG. 10A and the capacitance signal $C_4$ is at the position of point b due to a relative positional deviation, it cannot be determined only by the amplitude of capacitance signal $C_4$ whether the relation is at point b or at point c opposite thereto with respect to point a. In that case, the direction of the relative positional deviation with respect to the positioning complete position can be detected by detecting a value of another signal having a phase shift (which should not be an integral multiple of 180°), such as the capacitance signal $C_5$ shown in FIG. 10B, that is, by detecting an amplitude of the signal at point b' or at point c'.

Figure 12:
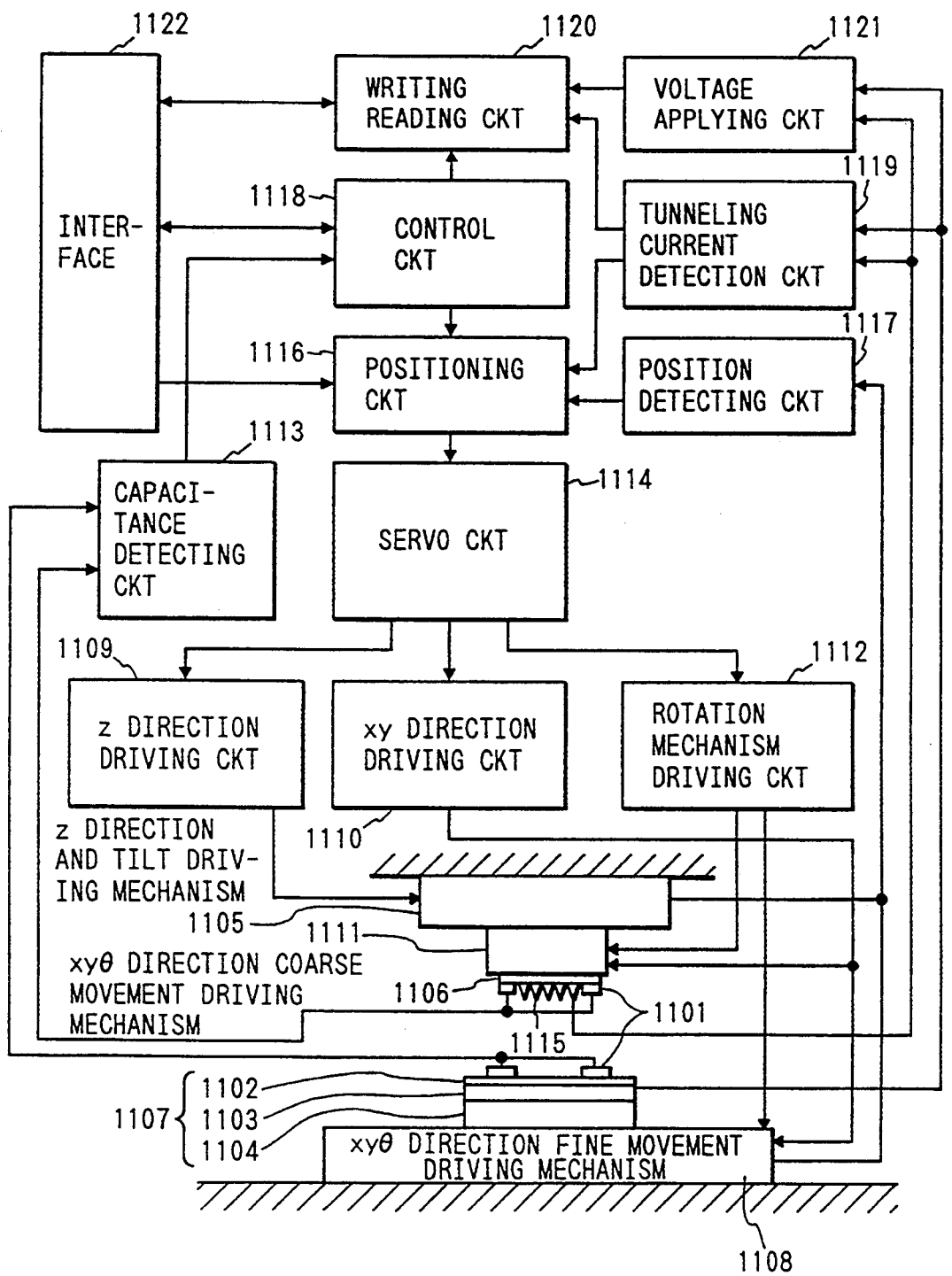
FIG. 12 is a block diagram showing an information processing apparatus provided with the surface-aligning mechanism based on the first embodiment.

FIG. 12 is a block diagram to show the structure of an embodiment of a recording/reproducing apparatus provided with the surface-aligning mechanism according to the present invention. Numeral 1101 denotes all upper and lower plate electrodes for detecting a capacitance therebetween used in positioning. Numeral 1102 denotes a recording medium, 1103 denotes a base electrode, 1104 denotes a recording medium substrate, 1105 denotes a z-direction and tilt driving mechanism for adjusting a distance between a multi-probe chip 1106 and a recording medium chip 1107 and a tilt thereof, 1108 denotes an xyθ fine motion driving mechanism, 1109 denotes a z-direction driving circuit, 1110 denotes an xy direction driving circuit, 1111 denotes an xyθ coarse motion driving mechanism, 1112 denotes a rotation mechanism driving circuit, 1113 denotes a capacitance detecting circuit for detecting capacitances from probe electrodes 1115 and the upper and lower plate electrodes 1101 provided on the recording medium 1102, 1114 denotes a servo circuit for servo-controlling the position of probe electrodes 1115 or the recording medium 1102, 1116 denotes a positioning circuit for determining the position of probe electrodes 1115 or the recording medium 1102, 1117 denotes a position detecting circuit, 1118 denotes a control circuit for executing the centralized control of interaction between blocks in the apparatus and processing of signals, 1119 denotes a tunnel current detecting circuit, 1120 denotes a write and read circuit for writing or reading information to be written or to be read under an instruction from the control circuit 1118, 1121 denotes a voltage applying circuit for applying a pulse voltage for writing between the probe electrodes 1115 and the base electrode 1103 to write data or for applying a voltage for reading therebetween, and 1122 denotes an interface for inputting or outputting writing or reading information, for inputting a control signal, or for outputting an address signal.

The operation of the invention is next described.

The tunnel current detecting circuit 1119 detects a current flowing between the probe electrodes 1115 and the recording medium 1102 to which a bias voltage is applied. A feedback control to keep the current constant is effected for the gap between the probe electrodes 1115 and the surface of recording medium 1102 through the positioning circuit 1116, the servo circuit 1114, the z-direction driving circuit 1109 and the z-direction driving mechanism 1105. Also, the probe electrodes 1115 are driven over the surface of recording medium 1102 by the xyθ coarse motion driving mechanism 1111 or by the xyθ fine motion driving mechanism 1108 with outputs from the xy direction driving circuit 1110 and the rotation mechanism driving circuit 1112. The position detecting circuit 1117 detects a position of probe electrode 1115 relative to the recording medium 1102 in each direction of x, y, z or θ. The detection output is processed by the positioning circuit 1116 together with the output from the control circuit 1117 to be output as a positioning signal to the servo circuit 1114. An output from the servo circuit 1114 is supplied to the xy direction driving circuit 1110, to the z direction driving circuit 1109 and to the rotation mechanism driving circuit 1112. The capacitance detecting circuit 1113 detects a capacitance between the electrodes for each position control in each direction of x, y, z or θ provided on the multi-probe chip 1106 and on the recording medium chip 1107, in accordance with movement in the each direction. A detected capacitance is supplied to the control circuit 1118. The control circuit 1118 executes operations such as the division for normalization as described previously, or the subtraction and the division for obtaining a rotational deviation, in addition to the centralized control of interaction between the blocks in the apparatus.

Figure 13:
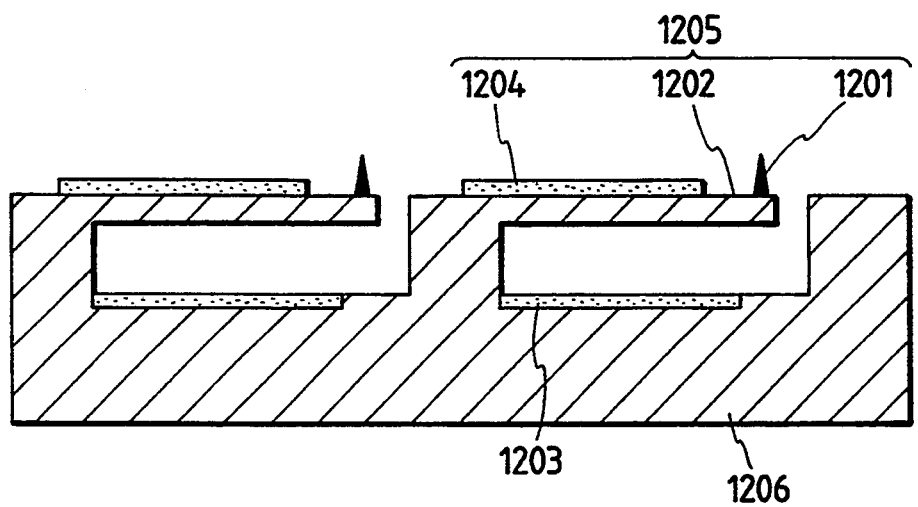
FIG. 13 is a partial cross section of an example of the arrangement of probes in the apparatus shown in FIG. 12.

The probes (as denoted by 103 in FIG. 2) on the multi-probe chip 1106 are formed by a processing technique called a micro machine or micro mechanics (for example as described in K. E, Peterson: "Silicon as a Mechanical Material," Proceedings of the IEEE, vol 70, p 420, 1982). FIG. 13 is a partial cross-sectional view to show an example of the structure of the probes. Numeral 1201 represents a tunnel probe for applying a voltage to the recording layer for detecting a tunnel current or recording signal. Numeral 1202 denotes a cantilever for moving the tunnel probe in the z direction, which is formed by the micro mechanics technology. Then, the cantilever can be displaced by an electrostatic force when an arbitrary voltage is applied between the electrodes 1203 and 1204. Numeral 1205 designates a probe electrode having a tunnel probe on a cantilever, and 1206 denotes a substrate on which probe electrodes are formed.

Also, the circuit elements such as the capacitance detecting circuit on the recording medium chip and the oscillation circuit on the multi-probe chip can be produced easily by the conventional silicon semiconductor fabrication technology.

The recording medium employed herein is for example one obtained by depositing on a support substrate a material exhibiting a memory effect having a switching property responsive to a voltage or a current. In this embodiment, the recording medium employed is formed by epitaxially growing gold on a silicon substrate and, using the substrate as the base electrode, building up two layers of monomolecular film of squarilium-bis-6-octylazulene molecules on the electrode substrate by the LB technique. The surface-aligning mechanism of the present invention as so arranged was used to conduct the relative positioning between the recording medium chip and the multi-probe chip, i.e., to effect relative positioning of plural probes to the recording medium. Then, information was recorded and reproduced. The operation was highly reliable without producing an error in the recording position or the reproducing position.

As described above, the three types of upper and lower electrode pairs are provided for detecting the amounts of x-directional, y-directional and θ-directional relative position deviations on the multi-probe chip and on the recording medium chip which are arranged to move in parallel relative to each other, detecting the change in the capacitances between the upper and lower electrodes depending upon a change in overlap state, and the multi-probe chip and the recording medium chip are relatively driven in the x direction, in the y direction and in the θ direction to obtain desired values of the capacitances, whereby the relative positioning can be made possible between the multi-probe chip and the recording medium chip without a reduction in accuracy.

Next described is the second embodiment of surface-aligning mechanism in an information processing apparatus of the present invention.

Figure 14:
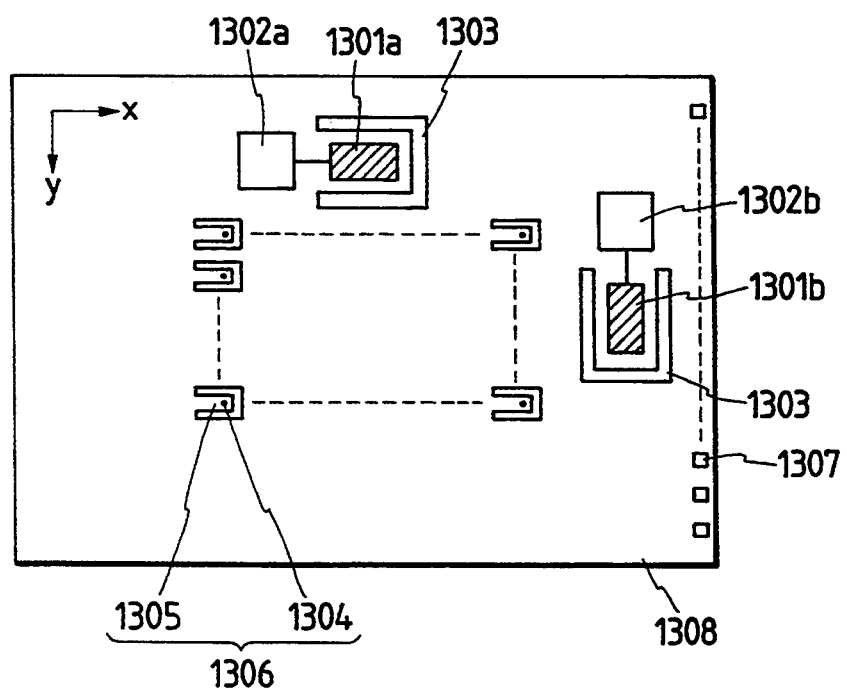
FIG. 14 is a drawing showing a second embodiment of a surface-aligning mechanism in an information processing apparatus of the present invention.

FIG. 14 shows the scheme of a surface-aligning mechanism. Probe units 1306, plate electrodes 1301a, 1301b and capacitance detecting circuit sections 1302a, 1302b are integrated on a silicon substrate 1308. Numeral 1301a denotes a plate electrode for x-directional positioning and 1301b denotes a plate electrode for y-directional positioning. Numeral 1303 designates a guard electrode for stopping the external influence on the capacitance, which enhances the accuracy of positioning. Numeral 1307 denotes bonding pads for a wiring output, which are also formed on the silicon substrate 1308.

The probe units 1306 are formed by the processing technique called the micro machine or micro mechanics (for example as described in K. E, Peterson: "Silicon as a Mechanical Material," Proceedings of the IEEE, vol 70, p 420, 1982). The circuit elements can be produced easily by the conventional silicon semiconductor fabrication technology.

Figure 17:
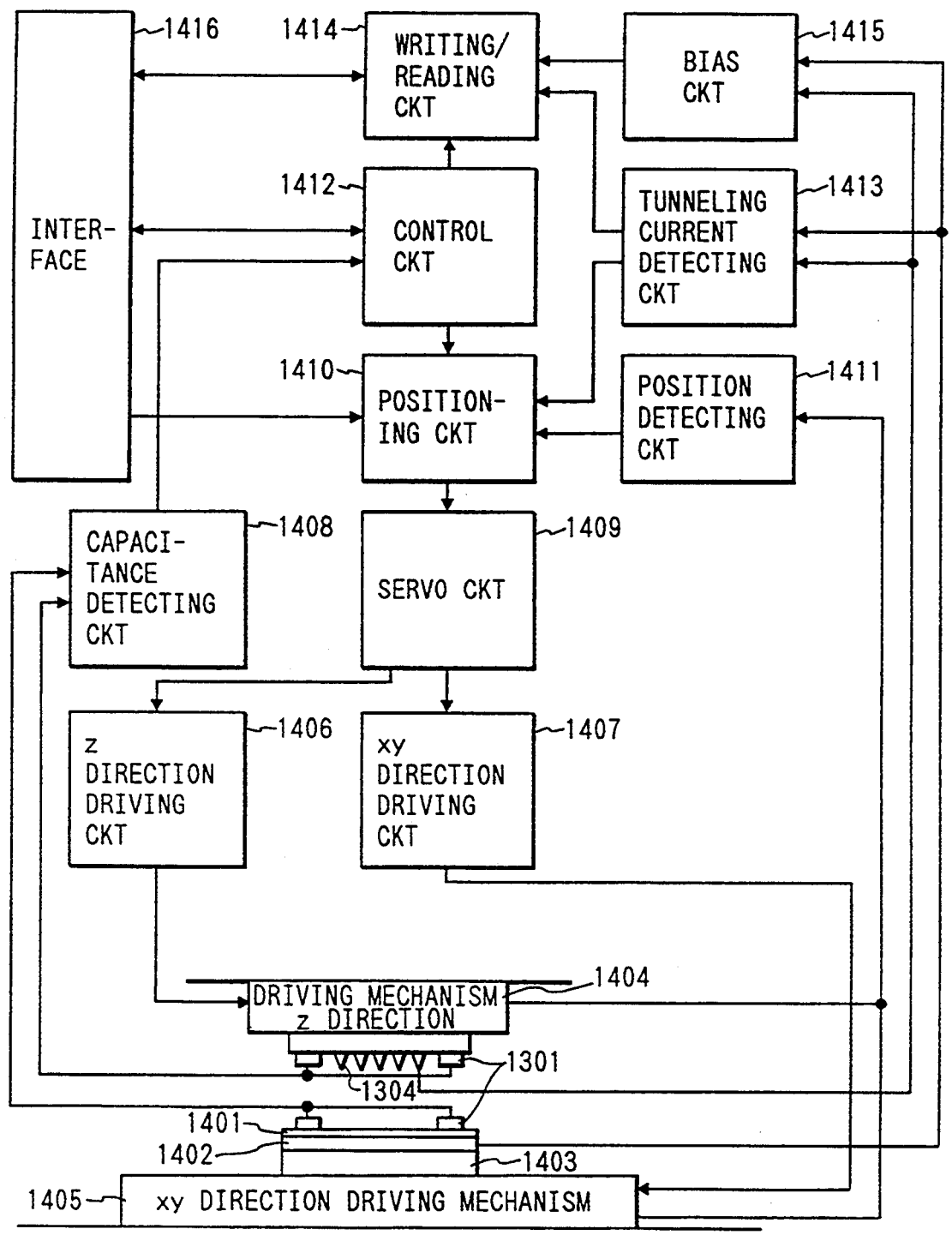
FIG. 17 is a block diagram showing an information processing apparatus provided with the surface-aligning mechanism based on the second embodiment of the present invention.

Associated plate electrodes 1301a, 1301b are also formed on a recording medium facing the multi-probe array head as shown in FIG. 17. The recording medium employed herein is one obtained by depositing on a support substrate a material exhibiting a memory effect having a switching property responsive to a voltage or a current. The recording medium employed is formed such that Au is epitaxially grown on a flat substrate of single crystal of $CaF_2$ and, using the substrate as the base electrode, two layers of monomolecular film of squarilium-bis-6-octylazulene molecules are built up on the electrode substrate.

Figure 15:
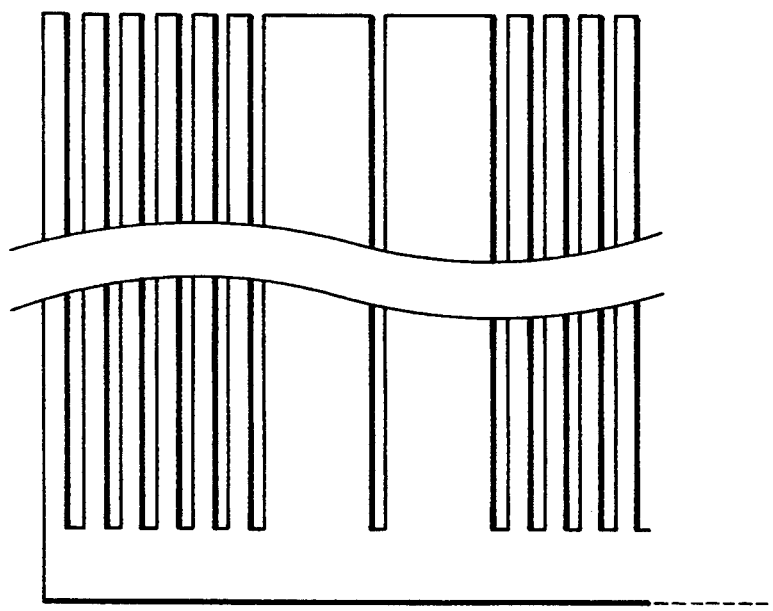
FIG. 15 is a drawing showing a pattern of a plate electrode as shown in FIG. 14.
Figure 16:
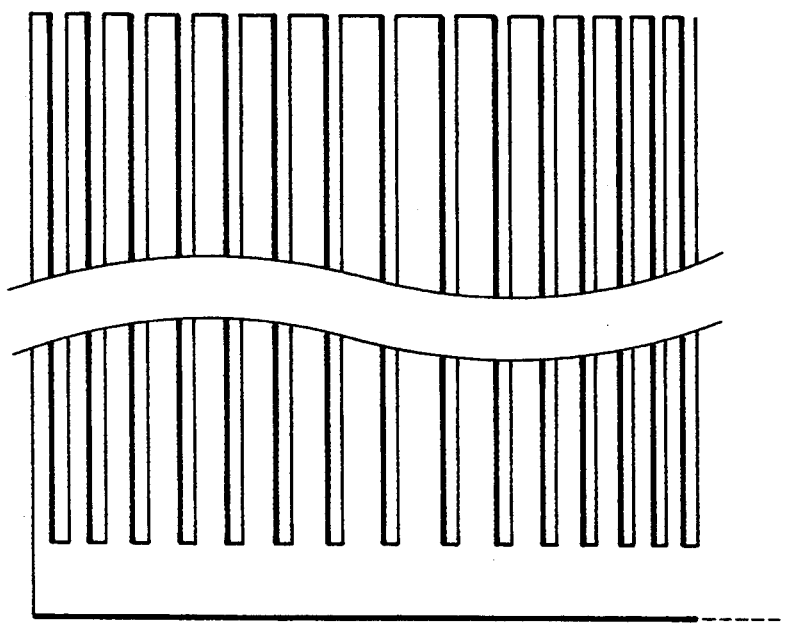
FIG. 16 is a drawing showing another example of a plate electrode.

FIG. 15 is a schematic diagram to show an enlarged electrode pattern of plate electrode 1301a, 1301b on the multi-probe array head and on the recording medium. The electrode pattern is of a comb-shaped electrode structure, in which strips of electrode pieces do not have a single width but have two types of widths periodically arranged. The spatial frequency component of the electrode pattern, namely periodical fineness of electrode width do not always have to be formed in two types of widths, but may be continuously changed in width as shown in FIG. 16. This embodiment employs the electrode pattern as shown in FIG. 15. The intervals between electrode pieces are 3 $\mu$m and the widths of the electrode pieces are 9 $\mu$m and 30 $\mu$m. The electrode pieces are arranged at a period of 120 $\mu$m. Also, the length of the strips of electrode pieces is 200 $\mu$m.

FIG. 17 is a block diagram showing the structure of an information processing apparatus using the surface-aligning mechanism as described above. Numeral 1301 designates plate electrodes for detecting a capacitance therebetween for positioning, 1401 denotes a recording medium, 1402 denotes a base electrode, 1403 denotes a recording medium substrate, 1404 denotes a Z direction driving mechanism for adjusting the distance between the multi-probe array head and the recording medium, 1405 denotes an XY direction driving mechanism, 1406 denotes a Z direction driving circuit, 1407 denotes an XY direction driving circuit, 1408 denotes a capacitance detecting circuit for detecting capacitances from the probe electrodes and from the plate electrodes 1301 provided on the recording medium, 1409 denotes a servo circuit for automatically controlling the position of probe electrodes or recording medium 1401, 1410 denotes a positioning circuit for determining the position of probe electrodes or recording medium 1401, 1411 denotes a position detecting circuit, 1412 denotes a control circuit for executing the centralized control of interaction between blocks in the apparatus, 1413 denotes a tunnel current detecting circuit, 1414 denotes a write and read circuit for writing or reading information to be written or to be read under an instruction from the control circuit 1412, 1415 denotes a bias circuit for applying a pulse voltage for writing between the probe electrodes and the base electrode 1402 or applying a voltage for reading therebetween, and 1416 denotes an interface for inputting or outputting writing or reading information, for inputting a control signal, or for outputting an address signal.

The operation of the present embodiment is next described.

The tunnel current detecting circuit 1413 detects a current flowing between the probe electrodes 1304 and the recording medium 1401 to which the bias voltage is applied. A feedback control to keep the current constant is effected for the distance between the probe electrodes 1304 and the surface of recording medium 1401 through the positioning circuit 1410, the Z-direction driving circuit 1406 and the Z direction driving mechanism. Also, the XY direction driving mechanism 1405 drives the probe electrodes 1304 over the surface of recording medium 1401 with an output from the XY driving circuit 1407. The position detecting circuit 1411 detects a position of probe electrodes relative to the recording medium in the X and Y directions. The detection output is processed together with the output from the control circuit 1412 in the positioning circuit 1410. The thus processed signal is output as a positioning signal to the servo circuit 1409. An output from the servo circuit 1409 is output to the XY direction driving circuit 1407. The capacitance changes depending upon the motion in the X or Y direction between the plate electrodes 1301 for the X direction or for the Y direction as arranged in the comb-shaped pattern on the multi-probe array head and on the recording medium. The capacitance detecting circuit 1408 detects the capacitances to supply the data to the control circuit 1412.

The positioning is made as follows in the information processing apparatus as so arranged. Using the Z direction driving mechanism 1404 in order to take the probe electrodes 1304 closer to the recording medium 1401, the probes are moved to a desired position while monitoring a tunnel current detected by the probe electrodes as a position signal.

Then, the recording medium 1401 is scanned at 0.1 Hz in the X direction by the XY direction driving mechanism 1405. Since the strips of electrode pieces different in width are periodically arranged, the capacitance of plate electrodes 1301 periodically changes depending upon an area of overlap between the electrode on the probe electrode 1304 side and the electrode on the recording medium 1401 side. A wave of longest period (120 $\mu$m in this example) is detected out of signal components in the capacitance change, and a coarse adjustment is made by obtaining the position of its wave crest.

Similarly, a component of a shorter period is then detected in correspondence with the strip electrode pattern of plate electrodes 1301, and a fine adjustment is made by obtaining the position of its wave crest. The same adjustment is carried out for the Y direction. In this example, the positioning was conducted in an alternate manner in the X direction and in the Y direction from the coarse adjustment to the fine adjustment. After that, observing an arbitrary probe electrode 1304, a pulse voltage with wave crest value of 4 V and pulse width of 0.1 $\mu$s was applied to record a signal. After the recording medium was scanned in the X and Y directions and when the electrode returned to the same position of the recorded wave crest, observed was a change in information, that is, reproduction of information on the surface of recording medium 1401, corresponding to an increase of about one figure as a reduced current value.

As described above, the positioning of a scanning surface was able to be made by repeating recording and reproduction. Also, no cross-talk occurred in recording or reproduction.

As described above, the present invention can permit high-accuracy positioning of a scanning surface by the plate electrodes for capacitance detection of one kind, which provides room for a wiring pattern on the probe electrode side so as to stop the occurence of cross-talk.

What is claimed is:

1. An information processing apparatus in which a surface of a first substrate having at least one probe for recording or reproduction is aligned with a surface of a second substrate supporting a recording medium, and which performs at least one of recording and reproduction of information on said medium by said probe, comprising:

first, second and third upper electrodes provided on the first substrate;

first, second and third lower electrodes provided on the second substrate opposed to said first, second and third upper electrodes, respectively;

first, second and third detecting means for detecting a first capacitance between said first upper and lower electrodes, a second capacitance between said second upper and lower electrodes and a third capacitance between said third upper and lower electrodes;

first driving means for moving the first and second substrates relative to each other in a first direction with respect to said substrate surfaces;

second driving means for moving the first and second substrates relative to each other in a second direction perpendicular to the first direction with respect to said substrate surfaces;

third driving means for rotating the first and second substrates relative to each other about an axis extending in a third direction perpendicular to the first and second directions; and control means for driving said first driving means to detect a different in the drive amount between a first position where the first capacitance becomes a predetermined value and a second position where the third capacitance becomes a predetermined value, said control means calculating an amount of relative rotational deviation of the first and second substrates about the axis in the third direction from a ratio between the difference in the drive amount and a center distance between said first upper and lower electrodes and said third upper and lower electrodes, and said control means driving said third driving means so as to correct the amount of relative rotational deviation and driving said first and second driving means so as to make the first and second capacitances become equal to respective predetermined values.

2. An information processing apparatus according to claim 1, wherein said electrodes are plate electrodes.

3. An information processing apparatus according to claim 1, further comprising:

a fourth upper electrode provided on the first substrate;

a fourth lower electrode provided on the second substrate as opposed to said fourth upper electrode; and fourth detecting means for detecting a capacitance between said fourth upper and lower electrodes;

wherein said control means calculates a ratio between a detection result of said fourth detecting means and a detection result of each of said first, second and third detecting means and drives said first, second and third driving means based on respective calculation results.

4. An information processing apparatus according to claim 1, wherein said first, second and third upper and lower electrodes comprise a pair comprising upper and lower electrodes for coarse adjustment and upper and lower electrodes for fine adjustment;

wherein said first, second and third detecting means each comprise coarse motion detecting means for detecting a capacitance between the upper and lower electrodes for coarse adjustment and fine motion detecting means for detecting a capacitance between the upper and lower electrodes for fine adjustment; and wherein said first, second and third driving means each comprise coarse motion driving means for coarsely moving and rotating the first and second substrates relative to each other based on a detection result of the coarse motion detecting means and fine motion driving means for finely moving or rotating the first and second substrates relative to each other based on a detection result of the fine motion detecting means.

5. An information processing apparatus according to claim 4, wherein a length of either one of said first or third upper and lower electrodes for coarse adjustment in the second direction is longer than a length of the other of said first or third upper and lower electrodes for coarse adjustment in the second direction; and wherein a length of either one of said second upper and lower electrodes for coarse adjustment in the first direction is longer than a length of the other of said second upper and lower electrodes for coarse adjustment in the first direction; and wherein a length of either one of said second upper and lower electrodes for coarse adjustment in the first direction is longer than a length of the other of said second upper and lower electrodes for coarse adjustment in the first direction.

6. An information processing apparatus according to claim 4, wherein said first, second and third upper and lower electrodes for fine adjustment are comb-shaped.

7. An information processing apparatus according to claim 1, further comprising:

first and second fine vibration means for providing a first relative fine vibration and a second relative fine vibration in the first direction and in said second direction, respectively, to the first and second substrates;

first and second synchronous detection means for detecting respective components synchronous with the first and second fine vibrations from said first and second detecting means; and third synchronous detection means for detecting a component synchronous with the first fine vibration from said third detecting means;

wherein said control means controls said first and second driving means based on detection results from said first and second synchronous detection means and controls said third driving means based on detection results from said first and third synchronous detection means.

8. An information processing apparatus in which a surface of a first substrate having at least one probe for recording or reproduction is aligned with a surface of a second substrate supporting a recording medium, and which performs at least one of recording and reproduction of information on said medium by said probe, comprising:

a first electrode provided on the first substrate;

a second electrode provided on the second substrate opposed to said first electrode;

detecting means for detecting a capacitance between said first electrode and said second electrode; and means for moving the first and second substrates relative to each other to align the surface of the first substrate with the surface of the second substrate in accordance with a detection result of said detecting means, wherein said first electrode and second electrode each have a comb-shaped pattern.

9. An information processing apparatus according to claim 8, wherein said pattern comprises a plurality of spatial frequency components.

* * * * *

UNITED STATES PATENT AND TRADEMARK OFFICE
CERTIFICATE OF CORRECTION

PATENT NO. : 5,418,771  Page 1 of 2
DATED : May 23, 1995
INVENTOR(S) : YUJI KASANUKI, et al.

It is certified that error appears in the above-indentified patent and that said Letters Patent is hereby corrected as shown below:

ON THE COVER PAGE

[54] Title

"SURFACE ALIGNING" should read --SURFACE-ALIGNING--.

[56] References Cited

FOREIGN PATENT DOCUMENTS

"3293908 12/1991 Japan
484750 3/1992 Japan
5109131 4/1993 Japan
5250734 4/1993 Japan" should read
--3-293908 12/1991 Japan
4-84750 3/1992 Japan
5-109131 4/1993 Japan
5-250734 4/1993 Japan--.

COLUMN 1

Line 3, "SURFACE ALIGNING" should read --SURFACE-ALIGNING--.

UNITED STATES PATENT AND TRADEMARK OFFICE
CERTIFICATE OF CORRECTION

PATENT NO. : 5,418,771

DATED : May 23, 1995

INVENTOR(S) : YUJI KASANUKI, et al.

It is certified that error appears in the above-indentified patent and that said Letters Patent is hereby corrected as shown below:

COLUMN 7

Line 61, "an" should read --a--.

COLUMN 17

Line 34, "different" should read --difference--.

Signed and Sealed this

Eighth Day of August, 1995

Attest:

BRUCE LEHMAN

*Attesting Officer*   *Commissioner of Patents and Trademarks*